Aug. 19, 1969  G. R. ONUFER  3,462,198

BALANCER FOR ROTATING BODY

Filed July 20, 1967  2 Sheets-Sheet 1

INVENTOR
GEORGE R. ONUFER
BY
*Burton & Parker*
ATTORNEYS

Aug. 19, 1969    G. R. ONUFER    3,462,198
BALANCER FOR ROTATING BODY
Filed July 20, 1967    2 Sheets-Sheet 2
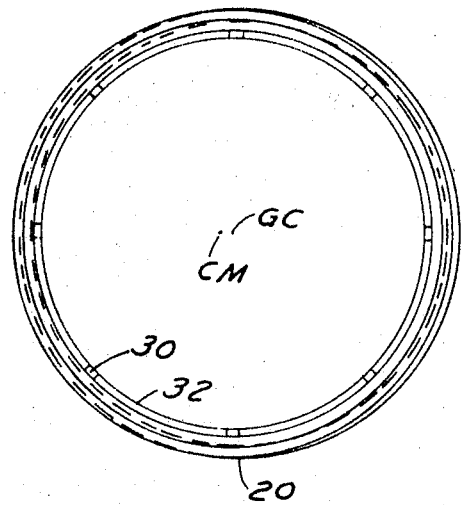
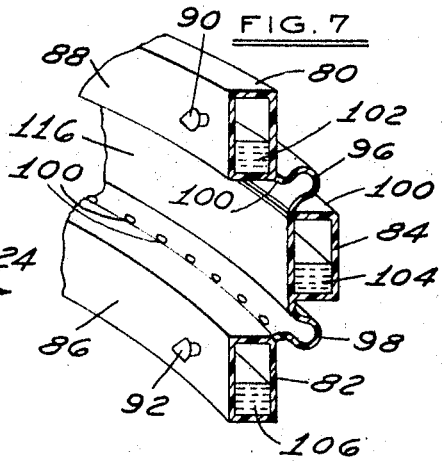
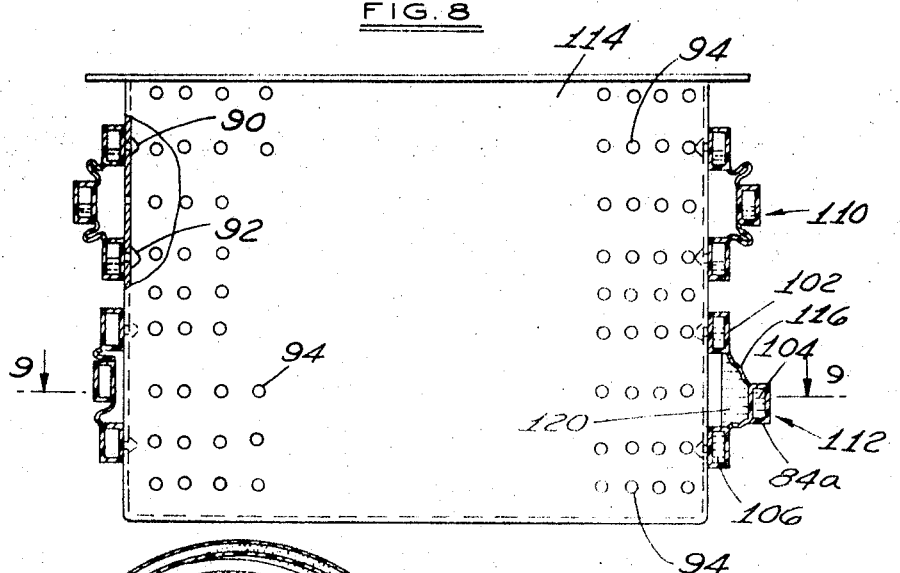
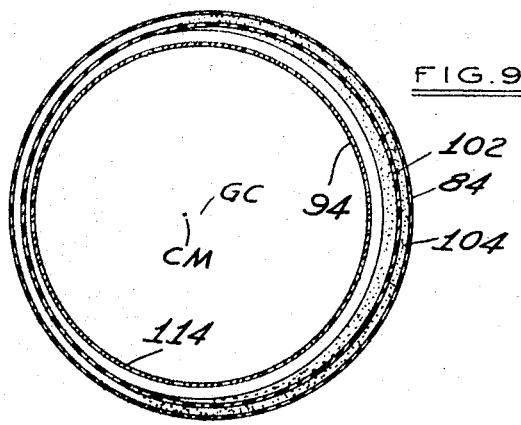
INVENTOR
GEORGE R. ONUFER
BY
Burton & Parker
ATTORNEYS United States Patent Office 3,462,198
Patented Aug. 19, 1969

3,462,198
BALANCER FOR ROTATING BODY
George R. Onufer, 555 Kingsley Trail,
Bloomfield Hills, Mich. 48013
Filed July 20, 1967, Ser. No. 659,280
Int. Cl. B60b 1/00, 27/00; G05g 1/00
U.S. Cl. 301—5                                    13 Claims

ABSTRACT OF THE DISCLOSURE

This disclosure relates to devices for automatically statically and dynamically balancing a rotating body such as an automobile wheel, clothes washer or drier tub and the like, in which a hollow annulus containing a balancing medium is mounted on the rotating body and secured thereto for both radial and axial displacement with respect to the axis of rotation of the body. The axial displacement of the annulus serves to correct for dynamic unbalance of the rotating body while the radial displacement serves to augment static as well as dynamic counterbalancing forces of the balancing medium in the annulus.

---

This invention relates to the automatic balancing of rotating bodies such as automobile wheels, clothes washer or drier tubs and the like, and is characterized by the provision of a hollow annulus containing a balancing medium, which annulus is mounted on the body substantially concentric with its axis of rotation, with the annulus supported on the body for both axial and radial displacement. The axial displacement serves to correct for dynamic unbalance of the body, and the radical displacement serves to aid both in the static as well as the dynamic balancing of the body.

Heretofore many suggestions have been made, as shown by prior art, for automatically balancing rotating bodies by the use of a hollow annulus mounted on the body and containing a balancing medium, such as metal balls, fluids, or a combination thereof. Such balancers have been tried on automotive wheels and clothes washer and drier tubs and have met with little success. In the case of automotive wheels, tests have indicated that there are critical speeds at about 35 miles an hour and again at about 70 miles an hour, and at such speeds automatic balancers have not appeared to function satisfactorily. In addition, wheel shimmy associated with dynamic unbalance has not been satisfactorily dampened by the use of the prior art automatic balancers.

Therefore it is an object of this invention to provide an automatic balancer which will serve to balance automotive vehicle wheels at all speeds and will also counteract the dynamic unbalance forces giving rise to wheel shimmy.

It is another object of this invention to provide an automatic balancer which will balance both static and dynamic unbalance in vehicle wheels, and clothes washer or drier tubs, and the like.

The invention has application for a wide variety of balancing environments, which will become apparent to those skilled in the art as the description proceeds.

FIG. 6 is a schematic plan view looking along the axis of a balancer embodying the invention and illustrating together with FIGS. 1 and 5 principles of the automatic balancing effected by this invention;

FIG. 7 is a fragmentary perspective view of an embodiment of the invention useful in connection with balancing a clothes washer or drier tub;

FIG. 8 is a plan view illustrating the mounting and general arrangement of the embodiment of FIG. 7 in a clothes washer or drier tub;

FIG. 9 is a cross-sectional view taken on the line 9–9 of FIG. 8; and

Figure 1:
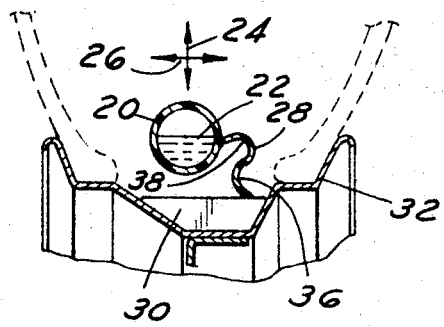
FIGS. 1, 2, 3 and 4 are fragmentary cross-sectional views of the upper portion of an automotive vehicle wheel rim showing respectively four embodiments of the invention.
Figure 5:
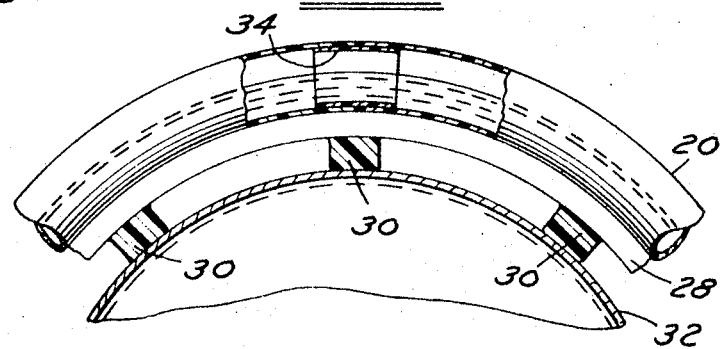
FIG. 5 is a fragmentary cross-sectional plan view through the upper portion of an automotive vehicle wheel rim showing the FIG. 1 embodiment.

Referring to FIGS. 1 and 5, the invention is shown in connection with an automotive vehicle wheel rim 32 and comprises a hollow annulus 20 which is mounted substantially concentrically with the axis of rotation of the rim. The annulus contains a balancing medium which preferably is in the form of a liquid which is not subject to freezing or undue expansion within the temperature range within which the balancer is intended to be used. The balancing medium may also comprise metal balls in a fluid suspension though the preferred form is a fluid alone. One fluid found satisfactory is a mixture of glycerin and mercury, though other fluids may also be found satisfactory. The fluid should preferably occupy substantially 180° of the annulus. It is illustrated in FIG. 1 at 22 only for the purpose of illustrating its presence as it is understood that the liquid would not be found at the top of the annulus with the wheel at rest, nor in the location shown if the wheel were in motion.

The annulus is supported on the vehicle rim for movement both radially, indicated by arrows 24, as well as axially, indicated by arrows 26. The compound movement thus permitted the tube is a feature of the invention. If the tube were displaceable axially but not radially, the movement of the balancing medium in the tube would tend to balance static unbalance forces in the wheel and the axial displacement of the tube would tend to balance dynamic unbalance forces in the wheel. Radial displacement, however, which allows for greater compensation of unbalance forces, contributes both to static as well as dynamic balancing.

Figure 10:
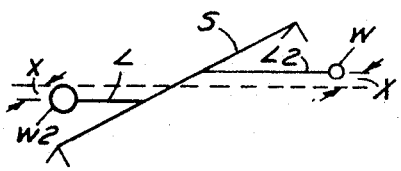
FIG. 10 is a diagrammatic illustration of a rotating system in static balnce but dynamic unbalance.

In this description the terms static and dynamic balance refer to the two balancing conditions normally associated with a rotating body. Static balance occurs in a body when the center of gravity coincides with its reactions. For example, a rotating body in static balance has its center of gravity coincident with its axis of rotation. A system may be in static balance but become unbalanced when the system rotates. Such unbalance is referred to as dynamic unbalance, and arises when the mass of the body creates a couple effect about the axis of rotation. In FIG. 10 I have shown for purposes of illustration a system in static balance but dynamic unbalance. A shaft S is provided with weights W and W2 on the ends of moment arms L and L2. W2 is twice the weight of W and moment arm L2 is twice the length of L. Obviously the forces on the shaft have a center of gravity coincident with the axis of rotation. However, as the shaft rotates W and W2 will create a couple effect as a result of their respective displacements X and Y from a plane perpendicular to the axis of rotation. If the weights move into the plane through the distances X and Y they will then provide a system which is in dynamic balance. The system may also be dynamically balanced by adding weights which will produce a couple equal in magnitude but in opposite direction to that created by weights W and W2. Such is the principle upon which the dynamic balance is achieved by the axial displacement of the annulus 20 of FIG. 1 and the other annuli of the remaining Figures of the drawings. By permitting the tube or annulus to shift axially the balancing medium is allowed to create a couple effect opposite in reaction and equal in magnitude to the dynamic unbalance of the wheel to achieve a dynamic balance.

In order to support the annulus on the wheel to allow compound movement, means are provided for supporting the tube which will allow it to shift both radially and axially. In FIGS. 1 and 5 such means comprises a flexible resistingly distortable web 28 which is secured at opposite ends to the annulus and to the wheel. The web is shown as being a continuous strip extending peripherally around the annulus being connected thereto at a side as shown in FIG. 1. The web, it should be understood, may consist of individual web segments rather than a continuous strip. The inner periphery of the web is connected to a series of feet 30, disposed at equidistantly spaced locations about the rim 32. The feet 30 are shaped to conform to the configuration of the rim and to nest within such configuration as shown in FIG. 1. The feet may be held to the rim in any suitable fashion, such as by adhesive securement, or tabs interlocking in depressions in the rim, or in any other suitable way which will occur to those skilled in the art.

The web 28 and annulus 20 may be formed of the same or dissimilar materials. If desired the annulus and web may be formed of polypropylene, neoprene or other suitable materials which will provide a fluid-tight raceway for the balancing medium and withstand the flexure and stresses imposed on it. The web should preferably be somewhat stiffly resilient so that the tube is normally supported substantially concentric with the rim but shiftable in response to the forces of the balancing medium within the annulus. This resisting of annulus displacement imposes forces on the rim that give rise to the balancing action.

The annulus may be formed of a length of tubing to which the web is connected at the side as shown in FIG. 1, substantially at the neutral axis. The web may be formed with the tubing as an integral part thereof or may be bonded, welded or otherwise secured thereto in any convenient fashion. The feet 30 may be secured to the web in any suitable fashion such as by bonding or welding.

Various methods of mounting the annulus on the wheel may be employed. According to one method the tube is first half filled with the balancing liquid and then placed about the rim bringing the feet 30 into nested relation within the rim and the ends of the tube then joined to provide a continuously hollow annulus. Various expedients may be used to join the tube ends. In FIG. 5 a short nipple section 34 is utilized over which the tube ends are telescoped. If the nipple and tube are formed of thermoplastic the joint may be heat sealed. On the other hand the ends of the tube may be shaped to simply telescope together with a suitable bonding, clamping, fusing or the like employed to secure the ends permanently together.

It will be noted that the web 28 is provided with a pair of what may be termed pleats at 36 and 38 which are no more than folds in the web. Such folds or pleats allow the tube to shift radially of the wheel as well as axially. With the web formed of a somewhat resistingly distortable maetrial, radial or axial displacement of the tube will exert a force on the wheel rim which will tend to counteract unbalance forces in response to which the annulus has been displaced.

Figure 2:
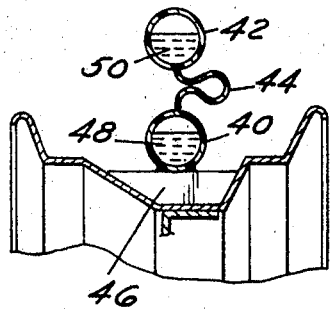

In FIG. 2 another form of the invention is shown wherein a pair of annuli 40 and 42 are shown in concentric relation connected by a web 44. The tube 40 is mounted directly on the feet 46 which correspond with the feet 30 heretofore mentioned. The tube 42 is capable of both radial and axial displacement relative to the wheel rim. The tube 40 is relatively stationary on the rim. Both tubes contain a balancing medium as shown at 48 and 50. The illustration of the balancing medium is only for the purpose of showing its presence, and for the reasons heretofore pointed out in connection with the medium 22 in FIG. 1, the balancing medium would not be shown in the position illustrated in FIG. 2 under operating or at rest conditions of the wheel. FIG. 2 provides a somewhat greater mass of counterbalancing fluid than in FIG. 1 and will tend to exert a greater static balancing effect than would merely the fluid contained within a single tube as in FIG. 1, and in addition the balancing medium in annulus 42 will not only serve a static, but also a dynamic balancing effect. The web 44 will, of course, flex to allow the axial and radial displacement of the tube 42. The materials of which the tubes 40 and 42 and the web 44 are made may correspond with the materials heretofore discussed in connection with the FIGS. 1 and 5 embodiment.

Figure 3:
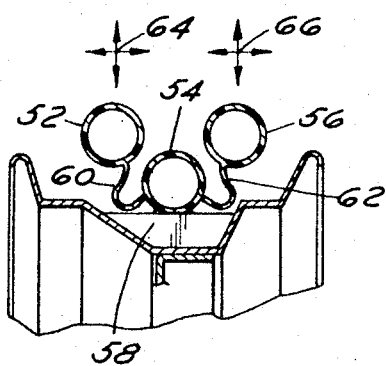

In FIG. 3 another embodiment of the invention is shown. Here three tubes 52, 54 and 56 are disclosed supported on the wheel rim. Tube 54 is mounted directly on the feet 58 which would correspond with the feet 30 heretofore discussed. Webs 60 and 62 interconnected the annuli 52 and 56 with the wheel. Such webs are connected at their outer ends to the annuli 52 and 56 and at their inner ends, for example, directly to the tube 54. Each of the tubes contains a balancing medium. Tubes 52 and 56 are capable of both axial and radial displacement in accordance with the arrows indicated generally at 64 and 66. The counterbalancing effect of the embodiment of FIG. 3 would be greater than that provided by either FIG. 1 or FIG. 2.

Figure 4:
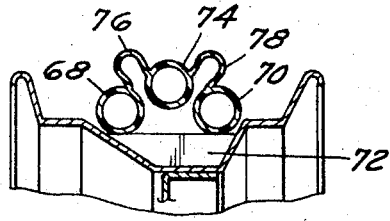

In FIG. 4 a three annuli balancer is shown in which tubes 68 and 70 are shown mounted on the feet 72 which correspond with the feet 30 heretofore discussed. A third tube 74 is supported by a pair of webs 76 and 78 from the tubes 68 and 70. Each of the tubes would contain a balancing medium. This system would provide substantial counterbalancing for static unbalance by virtue of the balancing medium in the tubes 68 and 70 and would also provide for dynamic unbalance as a consequence of the permitted axial displacement of the tube 74. Of course the tube 74 is also capable of compensating for static unbalance as a result of its capacity for radial displacement.

In FIGS. 1-4 a "tubeless" tire is shown in phantom outline at T, and the annulus of FIG. 1 or the annuli of FIGS. 2-4 will lie within or move within the tire.

In FIG. 6 the geometric center of the wheel is indicated at GC while its center of mass is indicated at CM. As the wheel rotates the annulus 20 is displaced to the right (at the instant during the wheel's rotation intended to be exemplified by FIG. 6) to offset the eccentric center of mass and effect a static balancing of the wheel. The wheel rim is indicated at 32, the feet at 30 and the arrow 24 the direction of radial displacement. Axial displacement of the tube is not shown in FIG. 6 but may be visualized by reference to FIG. 1 in connection with the arrow 26. In other words, considering FIG. 6, the tube or annulus 20 may be displaced toward or away from the viewer at opposite sides of the wheel in order to counterbalance a dynamically unbalanced condition.

FIG. 7 discloses a further embodiment of the invention for use in connection with a clothes washer or drier tub. As therein disclosed, three annuli are employed, namely 80, 82 and 84. These are shown in the form of tubes generally rectangularly shaped in cross-section. The inner face 86 and 88 of the tubes 80 and 82 may be provided with headed projections 90 and 92 at spaced points about the inner periphery of the tubes. These headed projections are adapted to be pressed into and lock within apertures 94 in the washer or drier tub to retain the tubes on the outer periphery of the tub wall. The tube 84 is connected to the tubes 80 and 82 by resistingly flexible webs 96 and 98 which may be provided with drain apertures 100 to allow the washing water to drain therefrom.

The tube ends may be joined similar to tube 20 heretofore described in connection with the automotive vehicle rim, namely the opposite ends of the tubes may be brought together about a rectangularly shaped nipple, or otherwise overlapped in any suitable fashion and secured to retain the balancing medium 102, 104 and 106 therein. The balancing medium may occupy substantially 50% of the available volume of each tube. The balancing medium 102, 104 and 106 may be in the form of a fluid similar to that discussed in connection with tube 20. The balancing medium should preferably have a specific gravity higher than that of water. The tubes 80, 82 and 84 may be formed of plastic material that will withstand the normal operating temperatures of the washer or drier within which its use is contemplated. The webs 96 and 98 may be formed of a suitable resilient material that will resistingly allow displacement of the tube 84 both radially and axially of the rotation of the tub axis.

Two sets of the balancers are shown mounted on the tub in FIG. 8, one set indicated at 110 and the other at 112. The balancing set 110 illustrates the system when the tub is at rest, while 112 illustrates a typical situation when the tub is rotating; the balancer tube 84a (at the instant illustrated by the figure) having shifted to the right to offset an unbalanced center of mass lying somewhat to the left of the axis of rotation of the tub. The tube 84a of the balancer 112 is also shown displaced vertically downwardly at the right and upwardly at the left to illustrate the dynamic counterbalancing which may be effected.

The drain holes 100 are located, it will be noted, adjacent the tubes 80 and 82 and when the tube 84 has been radially displaced, as illustrated by tube 84a in FIG. 8, washing water 120 in the tub 114 will be trapped between the webs and the inner face 116 of the tube 84 to add to the mass of the counterbalancing weight. When the tub comes to rest and the tube 84 resumes the position shown in the system at 110, the washing water trapped within the web will drain through the holes 100 and only the permanent balancing medium 102, 104 and 106 will remain.

In FIG. 9 the tub 114 is shown rotating about a geometric center GC while the center of mass of the clothes contained therewithin is indicated at CM and the counterbalancing tube 84 is shown as having been displaced radially to the right as viewed in FIG. 9 to offset the unbalanced force at CM. The theoretical distribution of the balancing medium is indicated at 102 and 104 in FIG. 9.

What is calimed is:

1. A balancer for a rotating body comprising: a hollow annulus for mounting on the body concentric with its axis of rotation, balancing weight means in the hollow annulus movable therearound in response to unbalance of the body to offset static unbalance of the body, and means for resistingly resiliently supporting the annulus on the body for axial displacement relative thereto in response to and offsetting dynamic unbalance of the body.

2. The invention as defined in claim 1 characterized in that the last mentioned means resiliently supports the annulus on the body for displacement both radially and axially of the body.

3. The invention defined in claim 1 characterized in that the last mentioned means comprises a resilient web secured at one end to the body and at the other end to the annulus and flexible axially of the body to allow axial shifting of the annulus.

4. The invention defined in claim 1 characterized in that the last mentioned means comprises a resilient web extending between the annulus and the body and secured thereto and flexible both axially and radially of the body to allow axial and radial shifting of the annulus with respect to the body.

5. A balancer for a rotating body comprising: a plurality of hollow annuli for mounting on the body concentric with its axis of rotation, balancing weight means in the hollow annuli movable therearound in response to unbalance of the body to offset static unbalance of the body, means for securing at least one of said annuli rigidly to the body, and means for securing another of said annuli to the body for axial displacement, said last mentioned means having a resilient part resistingly yielding to said axial displacement.

6. The invention as defined in claim 5 characterized in that said last mentioned means is secured to and extends between said rigidly mounted annuli and the annuli subject to axial displacement.

7. The invention defined in claim 5 characterized in that there are three annuli with one for rigid mounting on the body and two for axial displacement, and said last mentioned means comprises resilient portions extending between the rigidly mounted annuli and the annuli subject to axial displacement.

8. The invention defined in claim 5 characterized in that there are three annuli and two are for rigid mounting on the body and one of axial displacement, and said last mentioned means includes resilient portions interconnecting the annulus subject to axial displacemet with the rigidly mounted annuli.

9. A balancer for an automotive vehicle wheel having a rim part with a peripheral tire receiving groove, a hollow annulus for encircling the rim opposite the rim groove, balancing weight means in the annulus, and means for mounting the annulus on the rim including an attaching portion for securement to the rim and a resistingly displaceable annulus supporting portion extending between the attaching portion and the annulus and adapted to yield both radially and axially with respect to the rim when mounted thereon in response to and offsetting dynamic unbalance of the wheel.

10. The invention defined in claim 9 characterized in that the last mentioned means comprises a resilient web secured at one end to the annulus and for securement at the other end to the rim in the groove.

11. An auomatically balancing automotive vehicle wheel comprising a rim, a tire on the rim, a hollow annulus for circling the rim within the tire, balancing weight means in the annulus, and resistingly displaceable means interconnecting the annulus and rim for movement of the annulus in directions both radially and axially of the rim in response to and offsetting static and dynamic unbalance of the wheel.

12. A balancer for rotating clothes washer or drier tubs comprising: a hollow annulus for encircling the tub, balancing weight means in the annulus movable therethrough to offset unbalance forces in the tub, and resilient annulus supporting means interconnecting the annulus and the tub and resistingly yieldable axially of the tub to offset dynamic unbalance and yieldable radially to offset static unbalance.

13. The invention defined in claim 12 characterized in that said resilient annulus supporting means comprises a pair of annular webs connected at one edge to the annulus and at the opposite edge to the tub and forming between them and the annulus a wash water entrapping raceway movable with the annulus in response to unbalance of the tub.

References Cited

UNITED STATES PATENTS

| | | | |
|---|---|---|---|
| 331,450 | 12/1885 | Rothe. | |
| 2,525,781 | 10/1950 | De Remer. | |
| 2,831,369 | 4/1958 | Cahn | 74—573 |
| 3,012,820 | 12/1961 | King | 301—5 |
| 3,063,754 | 11/1962 | Pierce | 301—5 |
| 3,314,726 | 4/1967 | Rehnborg | 301—5 |

RICHARD J. JOHNSON, Primary Examiner

U.S. Cl. X.R.

74—573; 210—363